(12) United States Patent
Hawkins

(10) Patent No.: US 7,707,771 B1
(45) Date of Patent: May 4, 2010

(54) PLANT CULTIVATION APPARATUS

(76) Inventor: John T Hawkins, P.O. Box 59, St. Petersburg, FL (US) 33731

( * ) Notice: Subject to any disclaimer, the term of this patent is extended or adjusted under 35 U.S.C. 154(b) by 1061 days.

(21) Appl. No.: 11/308,141

(22) Filed: Mar. 8, 2006

Related U.S. Application Data

(60) Provisional application No. 60/594,062, filed on Mar. 8, 2005.

(51) Int. Cl.
*A01G 29/00* (2006.01)
(52) U.S. Cl. .................................. 47/48.5
(58) Field of Classification Search ............ 47/9, 47/56
See application file for complete search history.

(56) References Cited

U.S. PATENT DOCUMENTS

| | | | | |
|---|---|---|---|---|
| 2,030,267 | A | * | 2/1936 | Pratt ................ 47/9 |
| 2,038,019 | A | * | 4/1936 | Wright ............... 47/9 |
| 4,794,726 | A | * | 1/1989 | Fawcett et al. .......... 47/9 |
| 5,140,917 | A | | 8/1992 | Swanson |
| 5,193,306 | A | | 3/1993 | Whisenant |
| 5,389,116 | A | * | 2/1995 | Byrd ................. 47/9 |
| 5,524,387 | A | | 6/1996 | Whisenant |
| 6,195,935 | B1 | * | 3/2001 | Bellucci et al. ......... 47/9 |
| 6,332,287 | B1 | | 12/2001 | Geraldson |
| 6,640,490 | B1 | * | 11/2003 | Boehringer ............ 47/9 |
| 2004/0103580 | A1 | * | 6/2004 | Huang et al. ........... 47/9 |

FOREIGN PATENT DOCUMENTS

| | | | | |
|---|---|---|---|---|
| GB | 2270453 | * | 3/1994 | .......... 47/56 |
| JP | 355159022 | * | 12/1980 | .......... 47/9 |
| WO | WO9946974 | | 9/1999 | |

OTHER PUBLICATIONS

Bottcher, et al., Fertility Best Management Practices for Phosphorus Control on Organic Soils: Banding Fertilizer, AGR-53, Florida Cooperative Extension Service, Dec. 1992, p. 1-4.
Degomez, Fertilizing Home Gardens in Arizona, Cooperative Extension, College of Agriculture & Life Sciences, The University of Arizona, p. 1-6, http://ag.arizona.edu/pubs/garden/az1020.html.
Banding Means Higher Yield and Better Return on Investment, Fertilizer Technology, Bulletin No. SF.43.P14-16, FFF Review.

* cited by examiner

*Primary Examiner*—Francis T Palo
(74) *Attorney, Agent, or Firm*—Robert E. Smith; Thomas E. Toner; Smith & Hopen, P.A.

(57) ABSTRACT

A plant cultivation apparatus includes a water resistant sheet of material, with at least one opening formed in the sheet to enable growth of a plant through the opening. A fertilizer band, which can be contained within a membrane, is affixed to an underside of the sheet and includes a predetermined amount of a plant nutrient. The inventive apparatus is placed on top of a growing medium. With the fertilizer band in contact with the growing medium, a nutrient gradient is established so that plants growing through the openings formed in the sheet receive nutrition.

6 Claims, 5 Drawing Sheets

PLANT CULTIVATION APPARATUS

CROSS REFERENCE TO RELATED APPLICATIONS

This application claims priority to U.S. Patent Application 60/594,062, filed Mar. 8, 2005, which is fully incorporated herein by reference.

BACKGROUND OF THE INVENTION

The present invention relates generally to the growing and cultivation of plants. The method of developing a nutrient gradient for growing and cultivating crops was developed in the 1960s. Generally, a nutrient gradient is established in a growing medium by providing a strip (or band) of a soluble source of nutrition, such as nitrogen (N) and potassium (K), on the surface, or below the surface in tilled rows, in conjunction with a continuous water table using a mulch system of production.

The nutrients leach from the band and move through the growing medium by diffusion. In this manner, equilibrium is reached between the fertilizer band and the less-soluble nutrients found in the growing medium. Plant roots then grow toward the gradient. This system provides long term nutritional stability as the nutrients are not exposed to the elements and remain available for the plants.

SUMMARY OF INVENTION

The novel structure is a self-fertilizing apparatus for growing plants including an assembly sheet and at least one opening formed in the sheet by any suitable means to accommodate the growth of a plant through the opening. A fertilizer band, which can be contained within a membrane, is affixed to the underside of the assembly sheet and includes a predetermined amount of a plant nutrient. The inventive apparatus is placed on top of a growing medium. With the fertilizer band in contact with the growing medium, a nutrient gradient is established so that plants growing through the openings formed in the assembly sheet receive nutrition.

The shape of the assembly sheet can vary. Most commonly the sheet will be rectangular or circular, to accommodate commercially available growing pots.

In an alternate embodiment, the inventive apparatus is used in conjunction with a planting box. The planting box can be of any type. In this embodiment the planting box includes a bottom wall, at least one side wall and an open top which is disposed upward when the planting box is in use, and a divider, adjacent to the bottom wall of said planting box, spaced a distance from the bottom wall of said container defining a reservoir area below said divider and a growing area above said divider. More particularly, the novel plant cultivation apparatus includes an imperforate flexible or rigid sheet of material that forms a substantial barrier to water penetration therethrough. The sheet of material is formed of a material within which openings can be formed by any suitable means. The sheet of material has a top side and a bottom side and at least one indicia is imprinted on the top side to indicate where an opening is to be formed. A plant nutrient is secured to the bottom side of the sheet of material by any suitable means. The sheet of material is adapted to be disposed in overlying relation to a preselected area of the growing medium with the bottom side and therefore the plant nutrient in abutting engagement with the growing medium. The sheet of material therefore prevents unwanted plant growth in the growing medium for all areas of the growing medium covered by the sheet of material. The sheet of material stops unwanted plant growth but more importantly, the non-permeable sheet of material allows the fertilizer to slowly disperse into a gradient of high to low concentration within the growing medium, unaffected by water from above. Essentially, without rainwater dispersing the fertilizer, the nutrients will establish a gradient of concentration via capillary action. The plant roots will grow towards this nutrient gradient and will "self-monitor" the amount of nutrients to which they are exposed. This is distinct from conventional methods of washing nutrients towards the plant roots. A planter box has a removable false bottom wall so that water may be charged into the planter box to a predetermined depth. The false bottom wall is positioned in overlying relation to a surface of the water and is adapted to support a growing medium deposited atop it. The growing medium has a depth sufficient to sustain plant life. At least one wicking area if formed in the false bottom wall so that a wicking means draws water from below the false bottom wall into the growing medium. The sheet of material is adapted to rest atop the growing medium so that the plant nutrient secured to the bottom side thereof is in abutting relation to the growing medium and so that unwanted plant life is prevented from growing in areas of the growing medium covered by the sheet of material. The indicia is provided in the form of at least one geometric shape that forms an enclosure so that it indicates to a user that an opening is to be formed in the sheet of material in an area bounded by the enclosure. The indicia may further include a path of travel indicia extending from a peripheral edge of the sheet of material to the indicia.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

Figure 1:
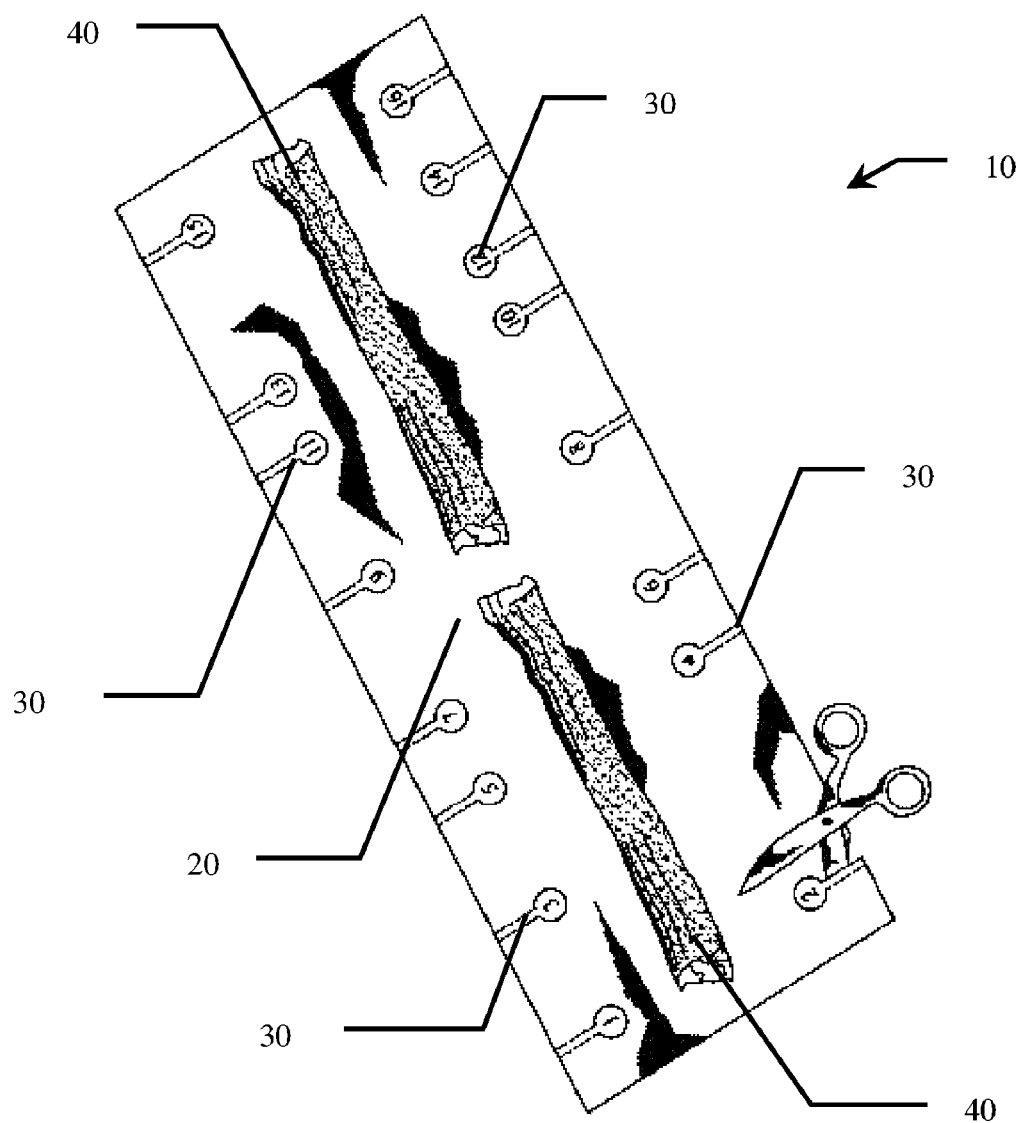
FIG. 1 is a perspective view of the inventive apparatus.

In one embodiment, shown in FIG. 1, the inventive apparatus 10 includes a sheet assembly 20 having predefined areas 30 which allow plants to grow there through. The sheet can either come with precut openings (not shown) or pre-printed areas which show the user where to cut (as in FIG. 1). On the underside of the sheet assembly is a band of fertilizer 40, or any plant nutrient. In one embodiment the band of fertilizer is encased within a membrane. It is also possible however to bind the necessary nutrients directly to the sheet without the use of a membrane. In an alternate embodiment, sheet assembly 20 is configured to allow plant growth around its perimeter, adjacent to its sides, rather than through the sheet. Although the embodiment of FIG. 1 shows a rectangular assembly sheet, many arrangements of these elements are contemplated.

Figure 2:
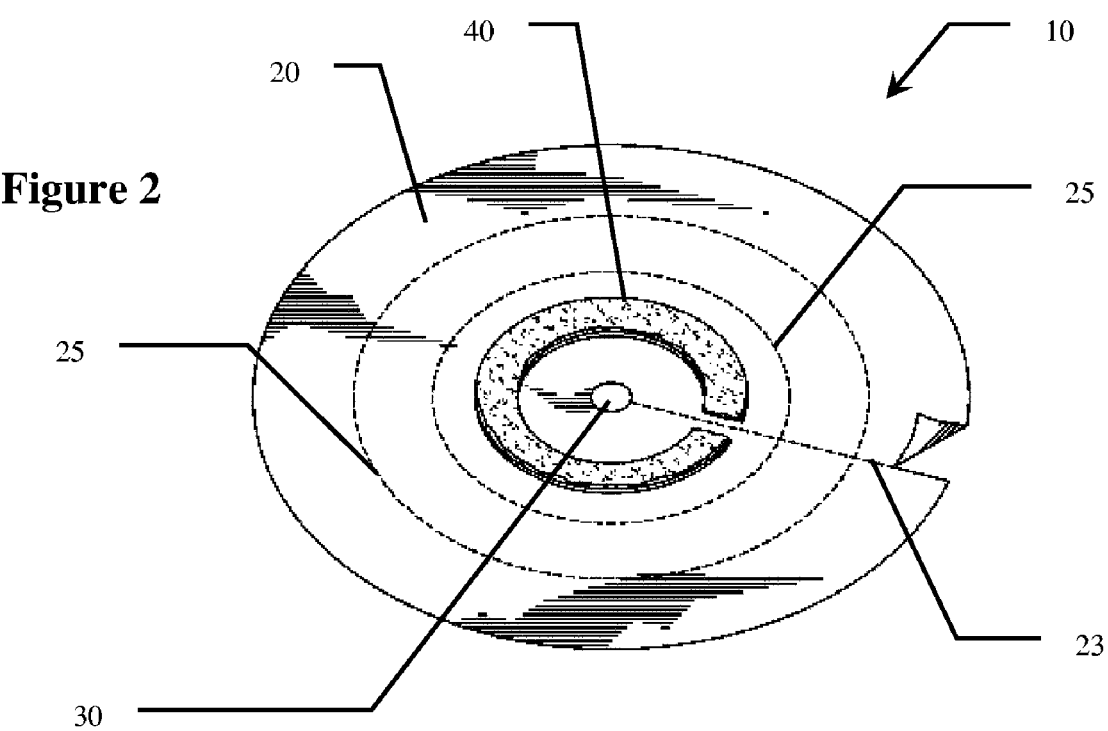
FIG. 2 is a perspective view of an alternative embodiment of the inventive apparatus wherein the pre-printed hole and fertilizer band are arranged for a circular planter.
Figure 3:
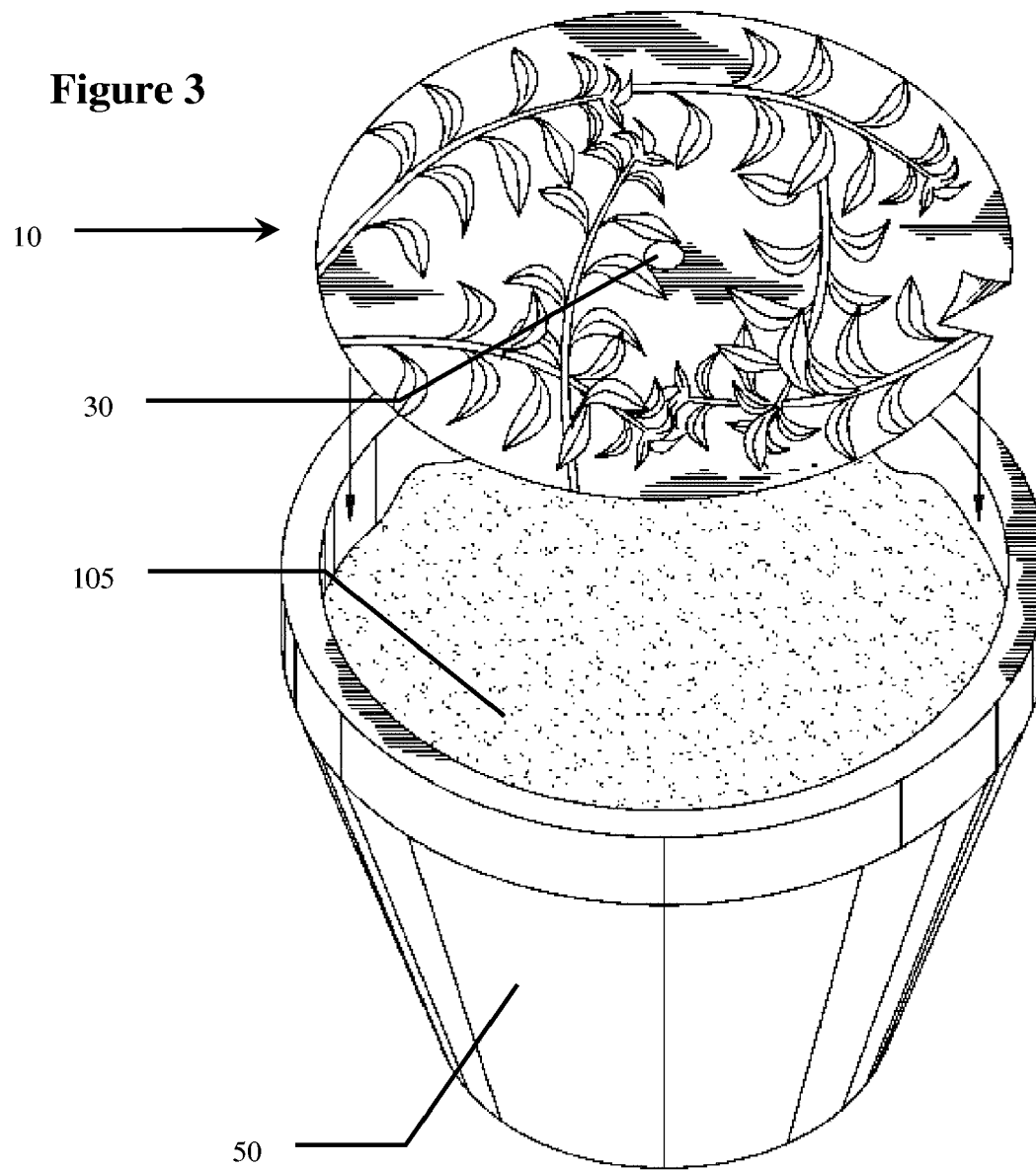
FIG. 3 is a perspective view of the inventive apparatus used in conjunction with a circular planter.

In FIGS. 2 and 3, for example, it can be seen how the inventive apparatus 10 can be adapted for use in a round planter. In this particular embodiment the inventive apparatus 10 is adapted for the growth of a single plant, such as a tree, through hole 30 the center of the sheet assembly 20. The band of fertilizer 40 is disposed within the form of a ring. In this manner, nutrients will move in a uniform fashion into the growing medium by diffusion. Sheet assembly 20 can be cut along any radius 23 therefore allowing the sheet assembly to be installed around an established tree or plant. Fertilizer band 40 can be disposed along any circumference 25 to accommodate the intended use of the apparatus. Likewise, sheet assembly 20 can be cut along any inner circumference 25 to accommodate the inner diameter of the intended planter. FIG. 3 provides a perspective view of how cultivation apparatus 10 is placed in overlying relation to growing medium 105 contained within planter 50. In an alternate embodiment, a plurality of growing areas which replace, or compliment, hole 30 are placed in multiple locations on sheet assembly 20.

Figure 4:
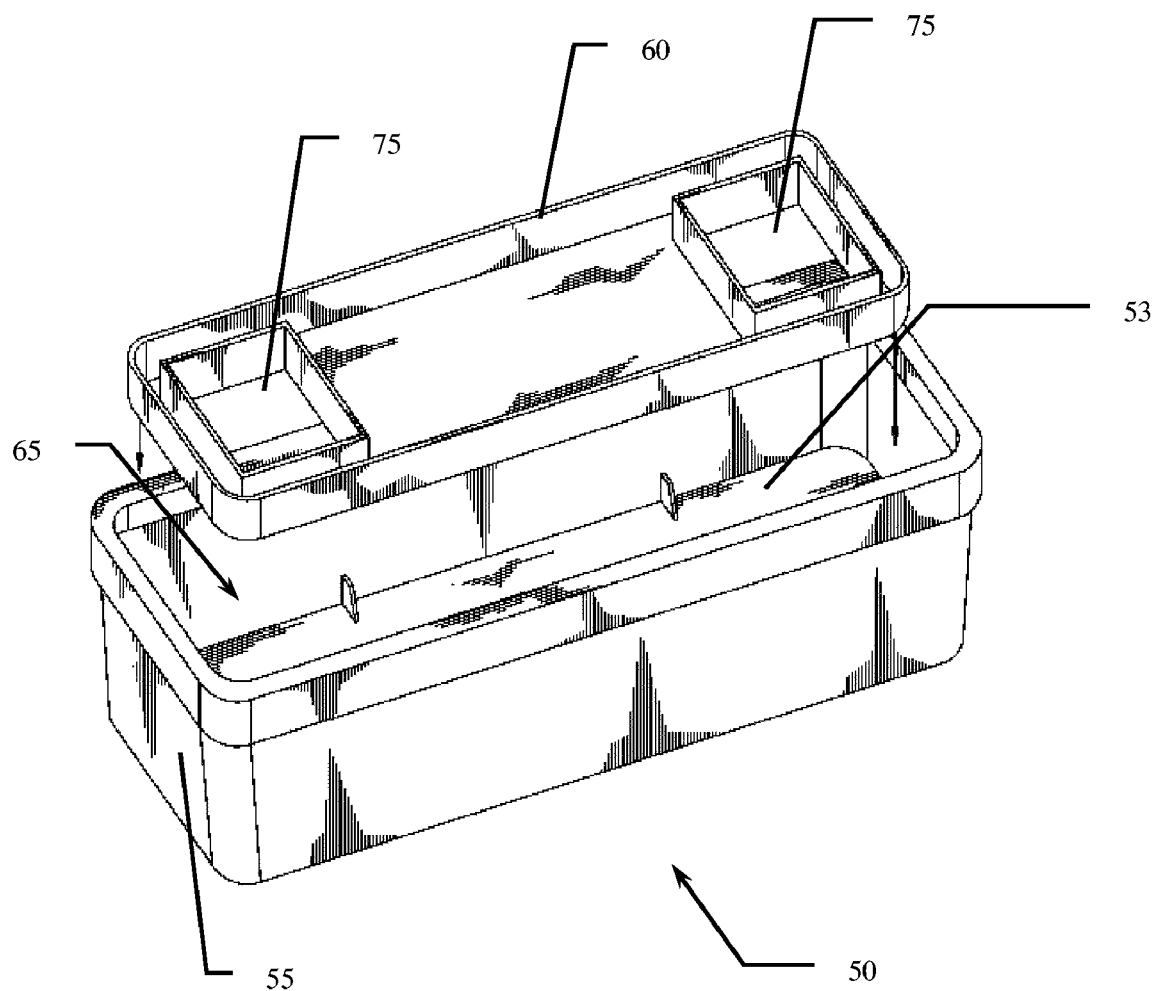
FIG. 4 is a semi-exploded perspective view of a planter.
Figure 5:
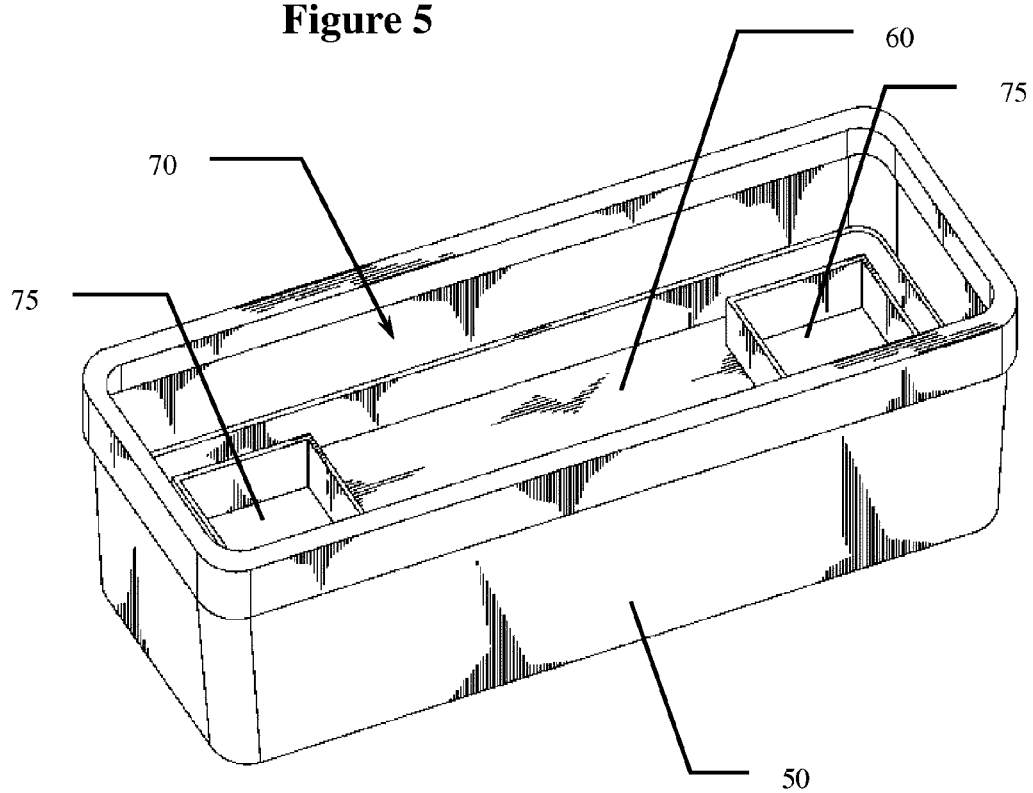
FIG. 5 is an assembled view of a planter.

As shown in FIG. 4, it is contemplated that the inventive apparatus 10 be used in conjunction with a planter box 50. Although a common planter box is shown in FIG. 4, inventive apparatus 10 can be used with any planter box. In this embodiment, planter box 50 comprises a bottom 53, at least one side wall 55 and an open top which is disposed upward when the planting box is in use. Planter box 50 is also equipped with a divider 60, adjacent to the bottom of said planting box 50, spaced a distance from the bottom of said container defining a reservoir 65 area below divider 60 and a growing area 70 above divider 60. To provide contact between growing area 70 and reservoir 65, wicking area 75 is provided. Wicking area 75 is any area in which the growing medium is placed in direct contact with the water sufficiently to facilitate movement of fluid from the reservoir throughout the growing medium. Although not shown, planting box 50 can be equipped with a liquid fill line and overflow aperture to aid in control of liquid levels in the reservoir.

Figure 6:
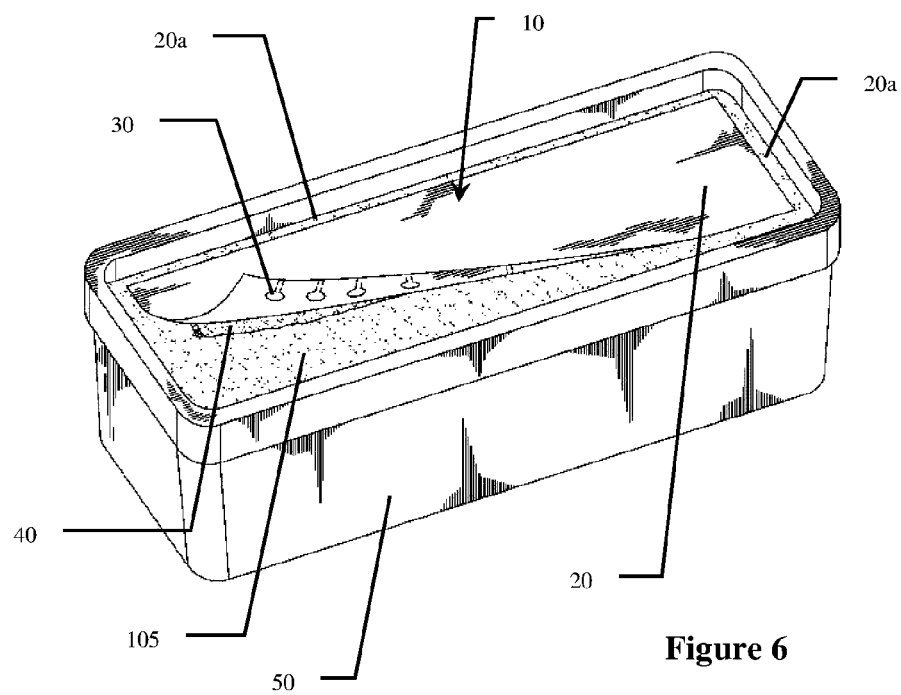
FIG. 6 is a perspective view of a planter used in conjunction with the inventive apparatus.

When fluid is placed in reservoir 65 and growing medium 105 is placed in growing area 70 and 75, as shown in FIG. 6, inventive apparatus 10 is placed over growing area 70. Care is taken to ensure that fertilizer band 40 comes into direct contact with growing medium. At this time, the pre-printed openings 30 are punched or cut out. Plants, saplings, or seeds are then planted through these openings directly in the growing medium. In one embodiment, the sheet assembly 20 defines space 20a and does not extend over the entire surface of growing area 70. In this way, moisture can evaporate from growing medium 70 at points away from the growing plants. This is helpful since, as water evaporates, salts and other minerals are left behind. Root-burn can occur if these minerals accumulate near the plant. The space also allows rainfall to permeate the growing medium, reducing the need for a user to water the plants or otherwise monitor the water in reservoir 65.

It will be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall there between. Now that the invention has been described,

What is claimed is:

1. A plant cultivation apparatus, comprising:
an imperforate sheet of material that forms a substantial barrier to water penetration therethrough;
said sheet of material being formed of a material within which openings can be formed;
said sheet of material having a top side and a bottom side;
a plant nutrient secured to said bottom side of said sheet of material;
said sheet of material adapted to be disposed in overlying relation to a preselected area of a growing medium with said bottom side and therefore said plant nutrient being in contact with said growing medium;
said sheet of material preventing unwanted plant growth in said growing medium for all areas of said growing medium covered by said sheet of material; and
said sheet of material protecting said plant nutrient from immediate contact by water applied to said top side of said sheet of material whether said water is applied manually or by natural rainfall, said water reaching said plant nutrient only after traveling through said growing medium;
whereby said plant nutrient cannot be quickly disbursed into said growing medium when water is applied atop said sheet of material.

2. The apparatus of claim 1, further comprising:
said sheet of material having at least one indicia imprinted on said top side that indicates where an opening is to be formed in said flexible sheet of material;
said indicia being at least one geometric shape that forms an enclosure, said at least one geometric shape indicating to a user that an opening is to be formed in said sheet of material in an area bounded by the enclosure.

3. The apparatus of claim 1, further comprising:
said indicia further including path of travel indicia extending from a peripheral edge of said sheet of material to said indicia.

4. A plant cultivation apparatus, comprising:
an imperforate sheet of material that forms a substantial barrier to water penetration therethrough;
said sheet of material being formed of a material within which openings can be formed;
said sheet of material having a top side and a bottom side;
a plant nutrient secured to said bottom side of said sheet of material;
a planter box having a removable false bottom wall so that water may be charged into said planter box to a predetermined depth;
said false bottom wall positioned in overlying relation to a surface of said water;
said false bottom wall adapted to support a growing medium deposited atop said false bottom wall, said growth medium having a depth sufficient to sustain plant life;
at least one wicking area formed in said false bottom wall, said wicking area being in contact with said water so that said water is wicked into said growing medium; and said sheet of material adapted to rest atop said preselected area of said growing medium so that said plant nutrient is in abutting relation to said preselected area of said growing medium and so that unwanted plant life is prevented from growing in said preselected area of said growing medium covered by said sheet of material;

said sheet of material protecting said plant nutrient from immediate contact by water applied to said top side of said sheet of material whether said water is applied manually or by natural rainfall, said water reaching said plant nutrient only after traveling through said growing medium;

whereby said plant nutrient cannot be quickly disbursed into said growing medium when water is applied atop said sheet of material.

5. The apparatus of claim 4, further comprising:

said sheet of material having at least one indicia imprinted on said top side that indicates where an opening is to be formed in said sheet of material;

said indicia being at least one geometric shape that forms an enclosure, said at least one geometric shape indicating to a user that an opening is to be formed in said sheet of material in an area bounded by the enclosure.

6. The apparatus of claim 4, further comprising:

said indicia further including path of travel indicia extending from a peripheral edge of said sheet of material to said indicia.

* * * * *